Patented Oct. 8, 1929

1,730,389

UNITED STATES PATENT OFFICE

WALTER O. SNELLING, OF ALLENTOWN, PENNSYLVANIA

PIGMENT

No Drawing.   Application filed October 9, 1924.  Serial No. 742,721.

My invention relates to improvements in pigments, and more particularly relates to the preparation of black pigments useful as substitutes for carbon black.

Carbon black produced by the incomplete combustion of oils and natural gas is well recognized to have very superior properties to such black pigments as can be made by the grinding to a fine state of division of black materials such as ordinary coal, charcoal and such brittle bituminous substances as gilsonite for example.

Although carbon black exists in an extremely fine state of subdivision, I have found that the superior characteristics of this material are not due wholly to this factor of fineness, and that even when a material such as coal or charcoal is ground to an equivalent degree of fineness in a colloid mill, or is subdivided to an equal extent by any other means, the product so obtained does not possess either the fine black color or the high coloring effect that carbon black has, and careful study has shown that this is due to a difference in the light-absorbing characteristics of the two materials.

It has long been known that materials when in a fine state of subdivision may have a quite different color than that of the same material in compact form, and I have found that this is particularly true when the subdivision of the material is carried to an extreme degree. Charcoal when very finely divided by grinding in a colloid mill gives a brown-black powder, while bituminous coal when similarly treated gives a powder which is dark chocolate brown in color.

Although products having the desirable characteristics of carbon black cannot be produced by the mere grinding of black materials such as charcoal, coal, gilsonite or like substances, even though such grinding or disintegration is carried on until colloidal dimensions are reached, I have discovered that pigments possessing desirable properties of blackness and fineness can be produced by first reducing a material such as coal or charcoal to a desired degree of subdivision, and then modifying the color of the pulverulent material so produced by means of a dye having a color complementary to that of the pulverulent material.

As an example of my present invention, I will describe a method which I may employ in preparing from ordinary charcoal a black pigment for use in the manufacture of printing ink. I first bring the charcoal to the desired degree of subdivision, preferably by wet grinding in an attrition mill of the type commonly known as a "colloid mill", any particles which are insufficiently ground being returned to the mill for regrinding. The very finely ground material, while still in wet condition, but after suitable dilution if desired, is next boiled in a dye bath having a color complementary to the dark red-brown or brown-black color of the finely divided charcoal. A suitable dye is the bluish variety of aniline black made by the oxidation of aniline by sodium bichromate in a solution containing hydrochloric acid. After completing the dyeing operation the powder is thoroughly washed, and is then cautiously dried in a stream of warm air until the desired degree of dryness has been reached, any lumps formed in drying being broken up by a further grinding operation.

Although I have referred specifically to the use of charcoal in the foregoing description, it will be evident that many equivalent materials such as anthracite coal, bituminous coal, gilsonite and oxidized asphaltum may be used, and these materials may be ground to any desired degree of fineness. Instead of blue-black aniline black I may employ blue-black sulfur black or any other dye that gives a color complementary to the color of the finely divided carbonaceous material. With some dyes the use of a mordant is required to enable the color to be retained by the finely ground carbonaceous material, but for permanence of color it is desirable that the dye used should be of the light-fast types such as the aniline blacks and the sulfur blacks, or should have similar "fastness". The amount of dye used is dependent on both the colorific or tinctorial power of the dye itself, and on the color and the fineness of division of the finely ground pigment, but in general I employ from as little as one part of dye to thirty parts of pigment to as much as one part of dye to three parts of the finely ground pigment, while under special conditions satisfactory results can be obtained by the use of an amount of dye varying through even wider limits. I prefer to use one part of dye for five to ten parts of pigment, sufficient dye being used to correct any tendency of the finely ground material to show a reddish, greenish, or other "off" tint. It will of course be evident that with any finely ground carbonaceous material which normally showed a blue-black color on being finely divided, a red-black dye would be used, in all cases the principle being to modify the shade of the "black" color of the finely divided pigment by the use of a dye of complementary color.

By the application of my present invention I am able to prepare pigments useful as substitutes for carbon black in the preparation of printing ink, varnish, enamels and for all like purposes, from such materials as charcoal, coal and other black carbonaceous substances.

I claim:

1. The process which comprises reducing a black carbonaceous material to particles of extreme fineness and dyeing the subdivided material with a dye of complementary color.

2. The process which comprises dispersing charcoal in water in a colloid mill and treating the product in a dye bath of complementary color.

3. The process which comprises subdividing charcoal in a colloid mill and dyeing the resulting product.

4. A new composition of matter, comprising very fine particles of a black carbonaceous material having a surface coating of a black dye.

5. A new composition of matter comprising finely subdivided charcoal having a surface coating of black dye.

6. A new composition of matter comprising finely divided charcoal dyed with aniline black.

7. A new composition of matter comprising particles of brown-black carbonaceous material having a surface coating of blue-black dye.

8. A new composition of matter comprising particles of charcoal having a surface coating of complementary color.

In testimony whereof, I have hereunto subscribed my name this 7th day of October, 1924.

WALTER O. SNELLING.